US009477230B2

(12) United States Patent
Sastre I Sastre (10) Patent No.: US 9,477,230 B2
(45) Date of Patent: Oct. 25, 2016

(54) METHOD FOR THE ACQUISITION AND PROCESSING OF GEOGRAPHICAL INFORMATION OF A PATH

(71) Applicant: GEONUMERICS, S.L., Castelldefels Barcelona (ES)

(72) Inventor: Jaume Sastre I Sastre, Barcelona (ES)

(73) Assignee: Geonumerics, S.L., Castelldefels, Barcelona (ES)

( * ) Notice: Subject to any disclaimer, the term of this patent is extended or adjusted under 35 U.S.C. 154(b) by 0 days.

(21) Appl. No.: 14/417,435

(22) PCT Filed: Jul. 22, 2013

(86) PCT No.: PCT/EP2013/065401
§ 371 (c)(1),
(2) Date: Jan. 26, 2015

(87) PCT Pub. No.: WO2014/016240
PCT Pub. Date: Jan. 30, 2014

(65) Prior Publication Data
US 2015/0192928 A1     Jul. 9, 2015

(30) Foreign Application Priority Data

Jul. 26, 2012 (ES) .................................. 201231200

(51) Int. Cl.
*G01C 22/00* (2006.01)
*G05D 1/00* (2006.01)
(Continued)

(52) U.S. Cl.
CPC ............. *G05D 1/0808* (2013.01); *G01C 11/02* (2013.01); *G01C 21/04* (2013.01); *G01C 25/00* (2013.01); *G05D 1/0094* (2013.01)

(58) Field of Classification Search
CPC ...... G01C 11/02; G01C 21/04; G01C 25/00; G05D 1/0094; G05D 1/0808
USPC ........................................................ 701/25
See application file for complete search history.

(56) References Cited

U.S. PATENT DOCUMENTS 5,894,323 A     4/1999    Kain et al.
7,418,320 B1    8/2008    Bodin et al.
(Continued)

FOREIGN PATENT DOCUMENTS

EP      2071353      6/2009

OTHER PUBLICATIONS

Stentz, A et al.: "Real-Time, Multi-Perspective Perception for Unmanned Ground Vehicles", Carnegie Mellon University, Robotics Institute, [Online] 16, Jan. 1, 2003.*
(Continued)

*Primary Examiner* — Calvin Cheung
*Assistant Examiner* — Paula L Schneider
(74) *Attorney, Agent, or Firm* — Gardner, Linn, Burkhart & Flory, LLP (57) ABSTRACT

The present invention provides a method for the simultaneous acquisition and processing of geographical information of a path acquired by tandem terrestrial and aerial missions comprising a terrestrial vehicle and an unmanned aircraft whose trajectory is slaved to the terrestrial vehicle. The method comprises: acquiring geographical data and information from the terrestrial vehicle; sending trajectory information to the aircraft from a control station hosted on the terrestrial vehicle; the aircraft determining its trajectory according to the trajectory information of the terrestrial vehicle received; acquiring geographical data and information, including images, from the aircraft; obtaining, in a processing module, the orientation of the sensors of both terrestrial vehicle and aircraft from the geographical data and information acquired; calibrating, in a processing module, the sensors of both terrestrial vehicle and aircraft from the geographical data and information acquired; and associating every image acquired with the orientation and calibration obtained.

11 Claims, 4 Drawing Sheets

(51) Int. Cl.
*G05D 1/08* (2006.01)
*G01C 11/02* (2006.01)
*G01C 25/00* (2006.01)
*G01C 21/04* (2006.01)

(56) References Cited

U.S. PATENT DOCUMENTS

| | | | |
|---|---|---|---|
| 2006/0058928 A1 | 3/2006 | Beard et al. | |
| 2006/0074557 A1 | 4/2006 | Mulligan et al. | |
| 2010/0017046 A1* | 1/2010 | Cheung | G01S 7/003 701/2 |
| 2010/0250022 A1* | 9/2010 | Hines | G05D 1/0094 701/2 |
| 2012/0078451 A1* | 3/2012 | Ohtomo | B64C 39/024 701/15 |
| 2013/0077891 A1* | 3/2013 | Nimnual | G06T 7/0034 382/276 |
| 2013/0162822 A1* | 6/2013 | Lee | H04N 7/185 348/146 |

OTHER PUBLICATIONS

International Search Report and Written Opinion for corresponding PCT Application No. PCT/EP2013/065401 dated Sep. 27, 2013.
Stentz, A et al.: "Real-Time, Multi-Perspective Perception for Unmanned Ground Vehicles", Carnegie Mellon University, Robotics Institute, Jan. 1, 2003 found at http://repository.cmu.edu/robotics/16.
M. Ani Hsieh et al.: "Adaptive teams of autonomous aerial and ground robots for situational awareness", Journal of Field Robotics, vol. 24, No. 11-12, Nov. 1, 2007, pp. 991-1014.
Spanish Search Report for corresponding Spanish Application No. P201231200 dated Dec. 21, 2012.
Colomina, I. et al.: "Towards a New Paradigm for High-Resolution Low-Cost Photogrammetry and Remote Sensing", The International Archives of the Photogrammetry, Remote Sensing and Spacial Information Sciences, vol. 37 (B1), Beijing, China 2008, pp. 1201-1206.

* cited by examiner

METHOD FOR THE ACQUISITION AND PROCESSING OF GEOGRAPHICAL INFORMATION OF A PATH

FIELD OF THE INVENTION

The present invention relates generally to mapping and more specifically to geodata acquisition of corridors by means of vehicles.

BACKGROUND OF THE INVENTION

Mapping, or corridor mapping, have always been performed either by terrestrial mobile mapping technologies or by aerial ones or by combinations thereof, but usually, only one of the two techniques is used.

In small geodata acquisition projects, unmanned aerial systems are used, above all, in military operations, the so-called DDD (dull, dirty and dangerous) missions. An unmanned aerial system is composed of a remotely piloted or unmanned aircraft, a ground control station and a radio data link that lets the unmanned aircraft and the ground control station communicate.

From a technological standpoint, the unmanned aircraft of an unmanned aerial system is an excellent platform to carry photogrammetric, remote sensing and other types of sensors and to carry out aerial sensing missions. As compared to a manned aircraft, an unmanned one is small, lightweight and inexpensive. Moreover, an unmanned aircraft benefits from the current progress in computer and sensor miniaturization.

From a legal—i.e., regulatory—standpoint, depending on the country, unmanned aerial system operations suffer either from lack of regulation or from too strict a regulation. Apart from military and governmental users, like police or firefighters, the use of an unmanned aerial system is many times perceived by the Civil Aviation Authorities and other country or local authorities as a threat to security. Civil Aviation Authorities are concerned about aircraft crashes caused by collision of manned aircraft with unmanned ones. Other authorities are concerned about the misuse of unmanned aerial system technology (terrorism and crime) or about unintentional damage to properties and people (accidents). In general, the larger and heavier the unmanned aircraft is, the more concerns about and restrictions to its operation. There are many concurrent and parallel efforts to develop European, American and worldwide consistent regulations like the Joint Authorities for Rulemaking on Unmanned Systems (JARUS) group with participation of 19 Civil Aviation Authorities as of today.

Most, if not all, existing regulations set three limits to unmanned aerial operations: a weight limit—the so-called Maximum Take Off Weight of the unmanned aircraft,—a distance within line-of-sight (LOS) between the ground control station and the unmanned aircraft—typically a few hundred meters—and a maximum flying height above ground—typically up to 300 m. The "within line-of-sight" or, simply, "LOS restriction" between the ground control station and the unmanned aircraft limits the scope and the productivity of the unmanned aerial system-based geodata acquisition missions as compared to the standard airborne ones. Therefore, apparently, unmanned aerial system-based geodata acquisition and mapping is an area of limited applicability and market.

However, there are more techniques of corridor mapping. For example, railway corridor mapping is usually performed with a terrestrial mobile mapping car or van mounted on a train, trolley or tramcar. Corridor hydro-graphic surveying is also performed many times with a terrestrial mobile mapping car on a small boat. But no simultaneous tandem aerial-terrestrial missions are performed, one of the reasons being that it is almost impossible (airplanes) or too expensive (helicopters) to make an aircraft fly over a terrestrial mobile mapping system at the low speeds of a terrestrial mobile mapping car, between 20 km/h and 60 km/h.

Generally, the missions described above are conducted separately; i.e., no simultaneous aerial-terrestrial missions are performed, thus data acquired in terrestrial mapping missions lack the top view. Analogously, data acquired in aerial mapping missions lack the lateral view of buildings' façades. This leads to duplicate acquisition missions (terrestrial and aerial), a limited, small mission area, or a wrong orientation of the terrestrial vehicle sensors in urban or natural canyons.

SUMMARY OF THE INVENTION

The present invention serves to solve the problems of double geodata acquisition missions (terrestrial and aerial); limited, small mission area for unmanned aerial systems based geodata acquisition missions; and wrong orientation of the terrestrial vehicle sensors in urban canyons in terrestrial corridor mobile mapping missions.

For example, geodata acquisition for large areas can be made feasible because the control station is mobile and therefore the "LOS restriction" is solved because the control station is installed in the terrestrial vehicle and maintains a short distance to the aircraft.

This opens the field of total aerial-terrestrial mapping at costs significantly inferior to the current mapping services combining different far more expensive missions by providing a method for the acquisition and processing of geographical information of a path.

According to one aspect of the invention, the method is characterized by the following steps:
  a) acquiring geographical data and information by means of a plurality of sensors of the terrestrial vehicle;
  b) sending trajectory information of the terrestrial vehicle to the aircraft, from a control station hosted on the terrestrial vehicle, every certain period of time, where the time period is a design parameter;
  c) when the aircraft receives the trajectory information of the terrestrial vehicle, the aircraft determining its trajectory according to the trajectory information of the terrestrial vehicle received;
  d) acquiring geographical data and information, including images, by means of a plurality of sensors of the aircraft;
  e) obtaining, in a processing module, the orientation of the sensors of both terrestrial vehicle and aircraft from the geographical data and information acquired;
  f) calibrating, in a processing module, the sensors of both terrestrial vehicle and aircraft from the geographical data and information acquired; and
  g) associating every image acquired with the orientation and calibration obtained in steps e) and f) respectively.

In another aspect of the proposed invention, the control station is part of the terrestrial vehicle. As the terrestrial vehicle moves, the control station becomes a "mobile control station" and since the aircraft follows the terrestrial vehicle —, at a constant height above it in one of the embodiments—the "LOS restriction" and "height restriction" are fulfilled.

The method of the invention may include identifying geometrical figures of known size and shape on the roof of the terrestrial vehicle by an image sensor of the aircraft.

In one embodiment of the invention, the step of obtaining the orientation and calibrating the sensors of the aircraft further including using positional, attitude, size and shape information of the geometrical figures on the roof of the terrestrial vehicle.

One embodiment of the invention comprises, in the step of obtaining the orientation and calibrating the sensors of both the terrestrial vehicle and the aircraft further including using geographical information previously known. This geographical information may be obtained from a map for example.

Another embodiment of the invention may include, in the step of obtaining the orientation and calibrating the sensors of both the terrestrial vehicle and the aircraft, using a same element in different images acquired by the image sensor of the aircraft and/or the terrestrial vehicle. A same element in different images is used as a tie point.

In one embodiment of the invention the images acquired are time tagged; i.e., they are synchronized to some time reference frame. Thus, during the post-processing phase it is useful for the synchronization of images to other time-tagged acquired data.

It is considered in some embodiments of the invention that aircraft follows the same trajectory than the terrestrial vehicle with a temporal and spatial offset where the time delay and a vector difference between the aircraft and the terrestrial vehicle is a design parameter that can vary with time according to the commands of an operator.

Optionally, the aircraft and the terrestrial vehicle acquire the geographical information and data simultaneously.

One aspect of the invention refers to the possibility in some embodiments of adjusting the trajectories data by means of analysing the data and geographical information obtained by the plurality of sensors of the terrestrial vehicle according to error patterns and known causes of errors to identify systematic errors, caused by a lack of accuracy suffered from GNSS multipath and occlusion problems, or the potential existence of systematic errors. When a possible systematic error is identified, the trajectory information acquired by the terrestrial vehicle is corrected by the geographical data and information acquired by the aircraft and by its trajectory.

Another aspect of the invention refers to a system for geographical information and data acquisition and geographical information and data processing characterized by:
  a terrestrial vehicle equipped with a plurality of sensors to acquire geographical information and data and a control station to control an aircraft;
  an aircraft in communication with the terrestrial vehicle, equipped with a plurality of sensors to acquire geographical information and data;
  a processing module in communication with both the terrestrial vehicle and the aircraft to process all the geographical information and data acquired by both the terrestrial vehicle and the aircraft.

The system may include image sensors both in the aircraft and in the terrestrial vehicle. It also may include geometrics figures (to be used as pointing and scale targets) and radiometric calibration targets (like colour cards, to be used for radiometric modelling and sensor radiometric calibration) on the roof of the terrestrial vehicle in some embodiments.

Another aspect of the invention refers to a computer program including program code means adapted to perform the steps of the method of proposed invention when said program is run on a general purpose processor, a digital signal processor, a FPGA, an ASIC, a micro-processor, a micro-controller, or any other form of programmable hardware.

The above features and advantages do not limit the present invention, and those skilled in the art will recognize additional features and advantages upon reading the following detailed description and upon viewing the accompanying drawings.

BRIEF DESCRIPTION OF THE DRAWINGS

To complete the description that is being made and with the object of assisting in a better understanding of the characteristics of the invention, in accordance with a preferred example of practical embodiment thereof, accompanying said description as an integral part thereof, is a set of drawings wherein, by way of illustration and not restrictively, the following has been represented.

DETAILED DESCRIPTION OF THE PREFERRED EMBODIMENTS

Referring now to the drawings and the illustrative embodiments depicted therein, methods and systems are provided for the acquisition and processing of geographical information of a path. The term "geographical information" refers specifically to geodata or in general, images and remotely sensed data of the Earth including navigation data like ranges to GNSS satellites or inertial measurements.

In one embodiment of the invention, this will be referred as mapKITE, the acquisition and processing of geographical information is made by a terrestrial vehicle and one or more aerial vehicles in a simultaneous and synchronized manner.

The input of an "integrated sensor orientation" (ISO) are measurements and the output are parameters. On the input the parameters are unknown. The unknown parameters are related to the known measurements through equations (also called "mathematical models"). Thus, an ISO is just a method and procedure to solve systems of equations whose known values are the "measurements" or "observations" and whose unknown values are the "parameters." The process of solving for the unknown "parameters" from known "measurements" and "mathematical models" is known as "parameter estimation."

The inclusion of a new type of measurement (the coordinates of a new type of ground control points), named as kinematic ground control points, in an integrated sensor orientation, allows an accurate estimation of the sensor orientation parameters in a post-processing phase.

This embodiment of mapKITE uses only one aerial vehicle to make the description clear. In fact, it is used an unmanned aircraft which follows the terrestrial vehicle.

There are two phases in the in the invention: an acquisition phase and a post-processing phase.

In the acquisition phase, the unmanned aircraft follows, at an approximate constant height above the terrain, a terrestrial vehicle. The unmanned aircraft, or the aircraft from now on, is equipped with a lightweight remote sensing payload and a navigation/orientation system, (being the term "navigation" understood as a real-time orientation and "orientation" is understood as, given an object and one of its coordinate reference frames b and given a global terrestrial coordinate reference frame f, orientation is the determination of the position, velocity and attitude parameters xf, vf, afb of b with respect to f.) and the terrestrial vehicle is also equipped with a navigation/orientation system, steers the aircraft by frequently uploading way-points via a radio-link. A "virtual TV-to-UA tether" steers the aircraft from the terrestrial vehicle trajectory MapKITE also takes time to acquire data for calibration of the sensors on board of the aircraft and the terrestrial vehicle.

The aircraft flies within line-of-sight (LOS) to the terrestrial vehicle at less the distance allowed by aeronautical, defence and local authorities. The terrestrial vehicle carries on its roof or somewhere else pointing targets consisting on geometrical figures of known size and shape that are visible from above. It also may carry on its roof or somewhere else radiometric calibration targets.

In the post-processing phase, the trajectories of the aircraft and the terrestrial vehicle are determined by processing the measurements of the navigation/orientation systems of the aircraft and the terrestrial vehicle respectively.

Then, photogrammetric measurements of tie points, static ground control points and of the kinematic ground control points are taken. A photogrammetric measurement is a 2D vector (x,y) and the result of a pointing action.

A human or artificial operator (e.g., a software system) produce a photogrammetric measurement by pointing to a point in an image that corresponds to a feature, say X, on the 3D space (usually the Earth surface and its man-made constructions). The measurement (x,y) is said to be "the image coordinates of the object feature X." Photogrammetric measurements are also called "image measurements", "image observations", "photogrammetric observations" or "photo-measurements."

Photogrammetric measurements of tie points, (which are points in the 3D space—in a 3D terrestrial reference frame—whose image coordinates have been measured in overlapping images taken by a Remote Sensing Payload (RSP) of the aircraft), of static ground control points (SGCP) (which are points in the 3D space—in a 3D terrestrial reference frame—that are materialized by some recognizable feature like a landmark, a painted target, a geodetic vertex or any other natural or man-made feature. A static ground point does not change its position with time.) and of the terrestrial vehicle pointing targets (kinematic ground control points, which are a new type of ground control points. They are 3D points in the 3D space—in a 3D terrestrial reference frame—that are materialized by some recognizable feature like a painted target. Generally speaking, their positions change with time. A kinematic ground control point (KGCP) can only be used by an observer if his instantaneous observation (of the KGCP) happens at a known time). In the rest of the document SGCP or, simply, ground control points (GCP) will be used interchangeably. Precise and accurate orientation and calibration parameters—for sensors in the aircraft and the terrestrial vehicle—are obtained by fusing the trajectory data (of the aircraft and of the terrestrial vehicle), the image measurements and the coordinates of the static and kinematic ground control points in an integrated sensor orientation (ISO) adjustment.

Figure 1:
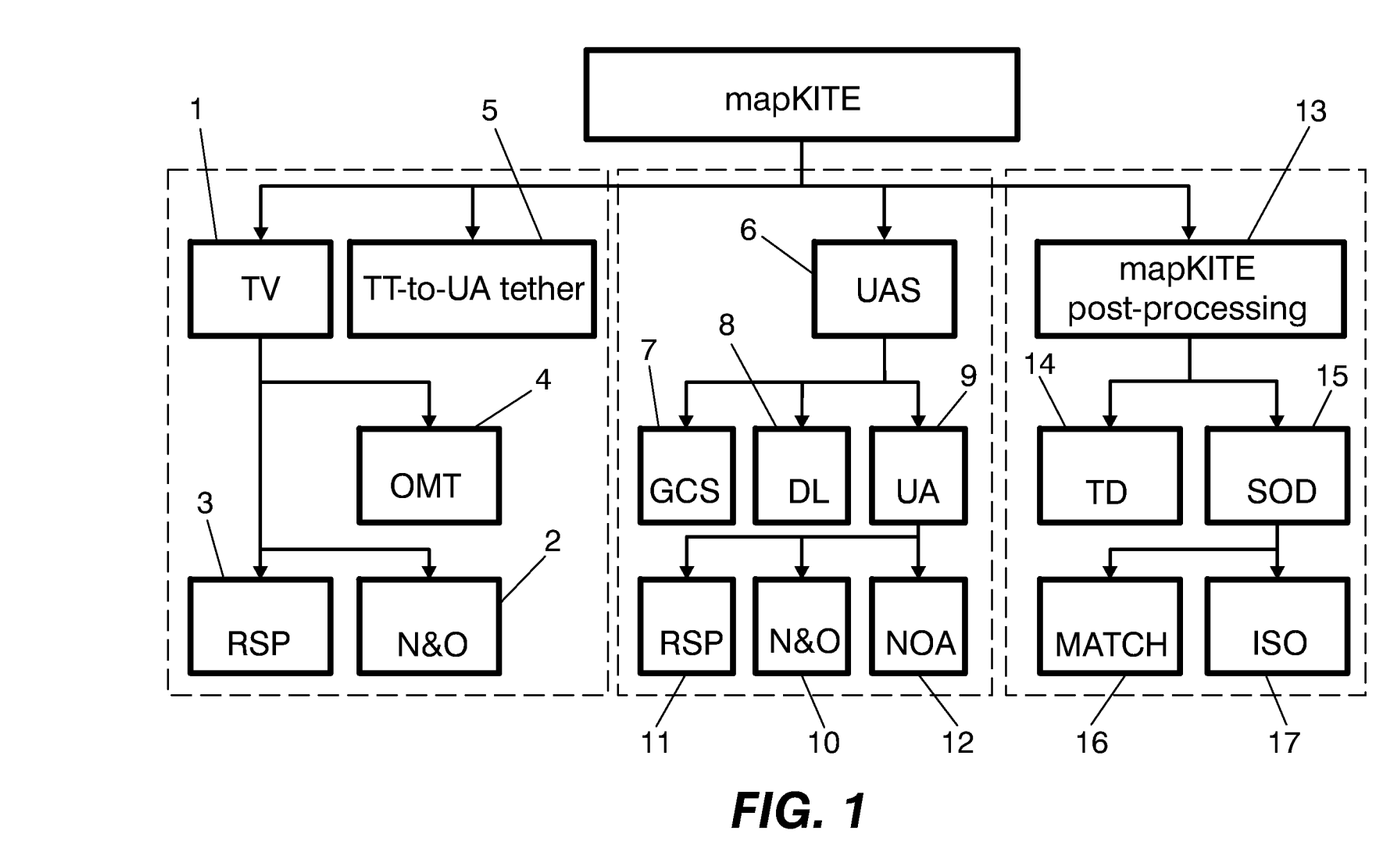
FIG. 1 is a block diagram depicting the subsystems in accordance with one embodiment of the invention.

In FIG. 1, all the elements of the embodiment of map-KITE are shown. However, they are grouped in three blocks: A) terrestrial vehicle, B) aircraft and C) processing module:

A)
Terrestrial vehicle 1: the terrestrial vehicle 1 can be equipped with a Remote Sensing Payload subsystem (RSP) 3. It includes a Navigation and Orientation subsystem (N&O) 2 and its Optical Metric Target subsystem (OMT) 4. The OMT 4 may include both geometrical pointing and scale targets and radiometric calibration targets. The terrestrial vehicle 1 carries a terrestrial vehicle-to-aircraft tether subsystem (TV-to-UA tether) 5 and a Ground Control Station subsystem of the unmanned aerial system (GCS) 7. It is driven by a human operator who follows a path previously set.

Navigation and Orientation subsystem 2 of the terrestrial vehicle 1: it is a real-time time, Position, Velocity and Attitude (tPVA) server, and a data logger of the navigation/orientation sensors. Implicit in its function of tPVA real-time server and measurements' data logger is the synchronization and time-tagging of the observations generated by the navigation/orientation sensors.

Navigation and Orientation subsystem 2 comprises a computer to read the measurements of the navigation/positioning sensors, at least one GNSS receiver of geodetic-grade and at least one inertial measurement unit. In some embodiments it may also comprise one or more odometers, one or more baroaltimeters and any other sensor that helps in estimating the tPVA solution.

In one embodiment, the navigation and orientation subsystem of the terrestrial vehicle may be aided by the navigation optical aiding subsystem of the aircraft deriving the terrestrial vehicle position form the aircraft position and attitude and from photogrammetric measurements of the terrestrial vehicle's OMT.

This element stores all the observations of the navigation/orientation sensors, time-tags them, and computes a real-time tPVA navigation solution.

Remote Sensing Payload 3 of the terrestrial vehicle 1: it captures images and stores them. The acquired images can be oriented in real-time or off-line with the tPVA output solution of the Navigation and Orientation subsystem 2 of the terrestrial vehicle 1.

Optical metric target 4 of the terrestrial vehicle 1: it is carried by the terrestrial vehicle on its roof. It consists of a number of pointing targets of known size, shape, colours, and relative fixed orientation between them. The optical metric target may include as well, in one embodiment, resolution and radiometric targets for the assessment of geometric resolution and radiometric calibration of the imaging sensors of the aircraft Remote Sensing Payload 3.

The optical metric target allows the identification of the kinematic ground control points (KGCPs) on the nadir images of the UA RSP. It also allows the estimation of the scale factor between the optical metric target and the nadir images of the aircraft Remote Sensing Payload 3.

The optical metric target may also be used in landing manoeuvres and for the localization of the terrestrial vehicle with the nadir pointing sensors of the aircraft Remote Sensing Payload 3.

Terrestrial vehicle-to-aircraft virtual tether 5: it is carried by the TV. It commands the aircraft 9 to proceed to its next way-point in a high frequency repetitive fashion.

Reading the tPVA solution from the terrestrial vehicle navigation and orientation subsystem, transform it into the desired aircraft's position and attitude and generate a "next way-point and heading" command. Then, the "next way-point and heading" is injected into the ground control station of the unmanned aerial system (that further uploads it to the aircraft 9 via a radio data link).

Figure 2:
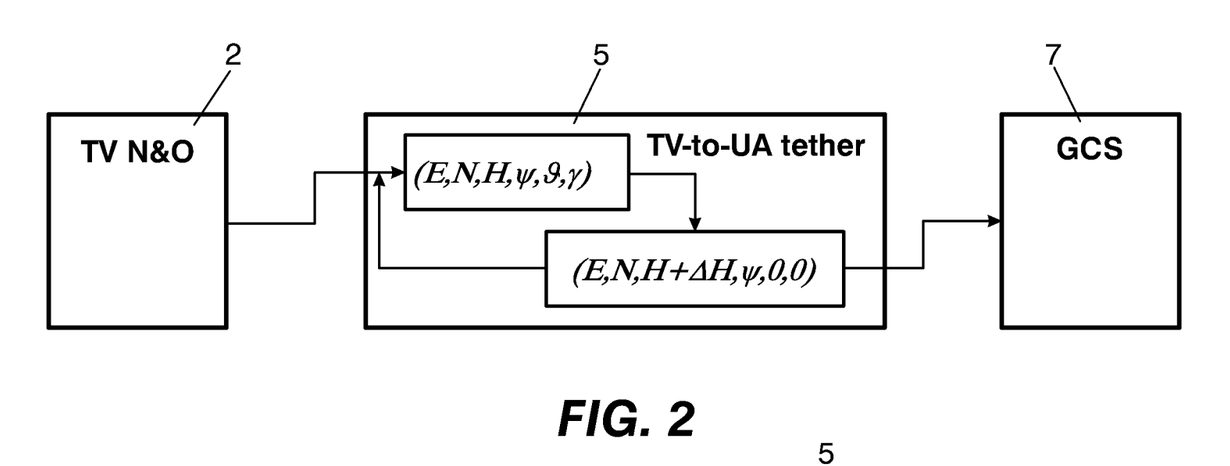
FIG. 2 is a block diagram depicting a terrestrial vehicle-to-aircraft subsystem.

This is the so-called "TV-to-UA loop" as depicted in FIG. 2 (en-route operation). Where "E", "N", "H" are the parameters for coordinates East, North and Height of the aircraft, and the parameters "$\psi$, $\theta$, $\gamma$" refer to the angles that define the attitude of the aircraft.

Figure 3:
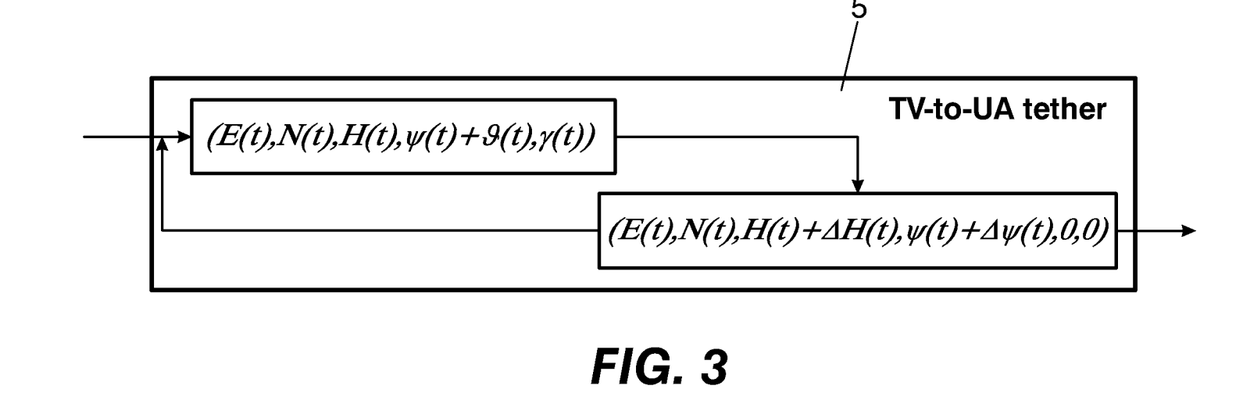
FIG. 3 is a block diagram depicting a terrestrial vehicle-to-aircraft subsystem for the calibration manoeuvre.

FIG. 3 illustrates the terrestrial-to-aircraft TV-to-UA loop for the calibration manoeuvre operation mode. The calibration manoeuvre of mapKITE takes advantage of the terrestrial vehicle stops, from those externally imposed like traffic lights to those decided by the mission operator for whatever reason, including the execution of a calibration manoeuvre. In this case the aircraft is commanded to go up and down, and to rotate itself while taking images at different altitudes and different headings angles $\psi(t)$.

B)

Unmanned aerial system 6: the unmanned aerial system (UAS) 6 has three subsystems: the ground control station (GCS) 7, the aircraft 9, and the radio data link (DL) 8 between the GCS 7 and the aircraft 9. It transports the Remote Sensing Payload (RSP) 3 of the aircraft 9 to points in space where it shall be activated. The UAS of mapKITE is a standard multi-rotor rotary wing aircraft being able to read way-points, to navigate at moderate speeds and to carry a geodetic-grade GNSS antenna and receiver.

Ground control station 7 of the unmanned aerial system 6: it is carried by the terrestrial vehicle 1. It controls the aircraft 9 through queries and commands that are sent to the aircraft through the unmanned aerial system radio data link (DL). The ground control station 7 of the unmanned aerial system 6 has a user interface (buttons, joysticks, displays and the like) and a data interface. Through this interface, the aircraft remote pilot can assume the manual control of the UA at any time.

Data link 8 of the unmanned aerial system 6: Data link 8 lets the aircraft to communicate with the ground control station 7 of the unmanned aerial system 6. It transports queries and commands from the ground control station to the aircraft and information from the aircraft back to the ground control station. The data link components are distributed between the ground control station and the aircraft.

Unmanned aircraft 9: it transports its Remote Sensing Payload to points in space where images shall be acquired. The embodiment of mapKITE does not require a particular design for the aircraft as long as it:
can fly smoothly at the same speed of the terrestrial vehicle;
can perform vertical take off and landing;
weights less than the—locally regulated, from 5 kg to 8 kg—weight of a micro aircraft;
can carry its Navigation and Orientation subsystem;
can carry its remote sensing payload;
can fly for a long time period (productivity issues).

With unmanned aerial systems current technology the most appropriate design of the aircraft for the embodiment of mapKITE is the multicopter as represented by the Falcon 8 and Falcon 12 of the Ascending Technologies GmbH company.

Navigation and orientation subsystem of the unmanned aircraft 10: it is composed of navigation and orientation sensors, computers and software programs that stores the sensors' measurements and real-time transforms them into time-position-velocity-attitude (tPVA) parameters. The stored measurements or observations will be later used by the invention post-processing subsystem for the optimal off-line orientation of the Remote Sensing Payload (RSP) of the aircraft. The real-time determined tPVA parameters will be real-time used by the aircraft flight control system.

The navigation and orientation subsystem of the unmanned aircraft contains, at least, an inertial measurement unit and, optionally or preferably, with a geodetic-grade GNSS receiver, although a normal GNSS receiver can also be used. Aircrafts are always equipped with a flight control system (FCS) that includes a navigation system. Also a baroaltimeter sensor is included in some embodiments of the invention.

Remote sensing payload of the unmanned aircraft 11: it contains the photogrammetric and remote sensing instruments of the aircraft. Its main function is the acquisition and time tagging (or synchronization) of imaging data (colour, infrared, thermal, radar, LiDAR and any other type of images). Part of these images can be used to aid the navigation sensors of the navigation and orientation subsystem.

In a particular embodiment of mapKITE, one of the remote sensing payload imaging sensors is an optical nadir-pointing one. The images of optical nadir-pointing sensors always capture the terrestrial vehicle and therefore the geometric and radiometric targets of the optical metric target 4, in each of its images, for the purpose of identification of the targets of the optical metric target subsystem for further:
a posteriori off-line join trajectory determination of the aircraft and the terrestrial vehicle trajectories,
real-time landing of the aircraft, and
real-time or off-line determination of the terrestrial vehicle position.

Navigation optical aiding subsystem 12: it scans the optical images of the remote sensing payload 11 in search of the optical metric targets of the terrestrial vehicle. Once they are located, the orientation of the imaging sensor together with the scale factor of the terrestrial vehicle's metric targets delivers an estimate of the terrestrial vehicle position.

The estimate of the terrestrial vehicle position can be used in two ways: it can be transmitted to the terrestrial vehicle via the aircraft data link, or it can be used by the aircraft to "follow" the terrestrial vehicle In the first case, the estimate of the TV position can be used by the navigation and orientation subsystem 2 of the terrestrial vehicle 1 to quality check its own navigation estimate and/or to correct it. This use of the navigation optical aiding subsystem is interesting when the estimate of the navigation and orientation subsystem 2 of the terrestrial vehicle 1 is not reliable or is suspicious of being wrong like in urban canyons or in heavy multipath environments.

The integration of the navigation optical aiding solution into the navigation and orientation subsystem 2 of the terrestrial vehicle 1 solution follows the principles of data fusion with sequential least-squares of Kalman filter techniques and that inconsistently large differences between the both navigation solutions are treated with outlier detection techniques.

In the second case, if the desired terrestrial vehicle-to-aircraft offsets between the terrestrial vehicle and the aircraft are known to the aircraft, the terrestrial vehicle navigation solution obtained by the navigation optical aiding subsystem can be used to make the aircraft follow the terrestrial vehicle which is of interest when the navigation and orientation subsystem of the terrestrial vehicle solution is not reliable or manifestly incorrect.

The function of the navigation optical aiding subsystem is therefore to estimate positions of the terrestrial vehicle.

C)
Trajectory determination subsystem 14: the trajectory determination subsystem does trajectory determination for the unmanned aircraft and the terrestrial vehicle. It computes the tPVA trajectory at the frequency of the aircraft and terrestrial vehicle orientation and navigation sensor's highest frequency. The primary source of observations for the trajectory determination are the navigation and orientation subsystems and the secondary optional source of observations for the trajectory determination are the remote sensing payload subsystems that provide imaging data that can be used in the aiding of the primary navigation sensors.

The trajectory determination subsystem is a GNSS/INS data fusion system that in, some embodiments, takes also input observations from other aiding sensors like optical cameras, laser scanners, odometers, air pressure sensors (baroaltimeters) and others.

The trajectory determination subsystem computes the tPVA trajectory at the frequency of the corresponding, aircraft or terrestrial vehicle, navigation and orientation subsystem. That is, at the frequency of the highest measurement rate of all sensors.

Sensor calibration and orientation determination subsystem 15: its function is to compute orientation and calibration parameters for the remote sensing payload sensor images given tPVA observations (from the navigation and orientation subsystems) and the images.

It combines tPVA trajectory observations (generated by the trajectory determination subsystem) with image observations of tie or control features (generated by the MATCH subsystem) to estimate orientation and calibration parameters of the remote sensing payload sensors. A control feature is a ground object that can be recognized and measured on an image such that its coordinates are known. Examples of control features are traditional, static, ground control points or kinematic ground control points proposed by present invention. Other examples of control features are ground control line segments or radiometric control points.

The sensor calibration and orientation determination subsystem can be used, in the same way, but with different observation inputs for different parameter outputs. There are two main tasks for the sensor calibration and orientation determination subsystem, the internal relative orientation and calibration, temporal and spatial, for each remote sensing payload subsystem and the external absolute orientation and calibration, geometric (or spatial) and radiometric, for the remote sensing payload subsystems.

Image matching subsystem (MATCH) 16: it performs automatic, although in some embodiments it may also work in an assisted and/or manual way, measurement of:
the image coordinates of homologous features in two or more images captured by the remote sensing payload;
the image coordinates of the optical metric targets—i.e., of the image coordinates of the kinematic ground control points (KGCPs)—as well as of their size and radiometry; and
the image coordinates of the ground control features and, in particular, of the static ground control points (GCPs).

MATCH solves the image correspondence problem and generates the image coordinates of image tie features.

It can be applied to images acquired by the remote sensing payload of both, the aircraft and the terrestrial vehicle; i.e., it can match tie features in two or more of the images of the aircraft, of the terrestrial vehicle, or even of the aircraft and the terrestrial vehicle. MATCH can use tPVA trajectory data to facilitate the identification and measurement of tie and control features but is able to do the matching without the tPVA data.

Thus, the function of the MATCH subsystem is to measure—i.e., generate image observations—image coordinates of ground tie features on two or more images, to measure image coordinates of static ground control features on one or more images, to measure image coordinates of kinematic ground control features on single images and to measure the scale factor between the actual OMT targets and their representation on the remote sensing payload images.

Integrated sensor orientation subsystem (ISO) 17: its function is to estimate sensor orientation and calibration parameters, for the sensors of the remote sensing payload subsystem of both the aircraft and the terrestrial vehicle, from observations. ISO subsystem does network adjustment for the remote sensing payload images. It consists in a least-squares self-calibrating bundle adjustment with the classical bundle adjustment observations (image coordinates' observations, ground control points and tPVA observations derived from GNSS/INS observations) and the observations proposed by the embodiment of the invention called mapKITE (kinematic ground control points, distances of and between the targets of the OMT and scale of the OMT targets on the images).

ISO subsystem, in one of the embodiments, does network adjustment for the remote sensing payload subsystems images estimating errors in the tPVA trajectory of the terrestrial vehicle by introducing error modelling parameters—trajectory segment shifts—in artificial (urban areas) and natural canyons where the GNSS occlusions and multipath are likely to generate GNSS errors that cannot be corrected by the trajectory determination subsystem when processing the navigation and orientation observation.

Referring to the operation of the invention, in the embodiment of mapKITE, consists on a plurality of segments. The periods between segments are called bases. The operation starts with a take-off calibration manoeuvre, then an en-route data acquisition part, and finally a landing manoeuvre. In the take-off and calibration manoeuvre, the aircraft takes off from the neighbourhood of the terrestrial vehicle and performs a calibration manoeuvre above the terrestrial vehicle while it climbs to its operational en-route altitude. Immediately after this, in the en-route data acquisition part, the terrestrial vehicle starts circulating and acquiring data while being followed by the aircraft that is also acquiring data. The data acquisition part ends by landing smoothly the aircraft in the neighbourhood of the terrestrial vehicle.

Figure 4:
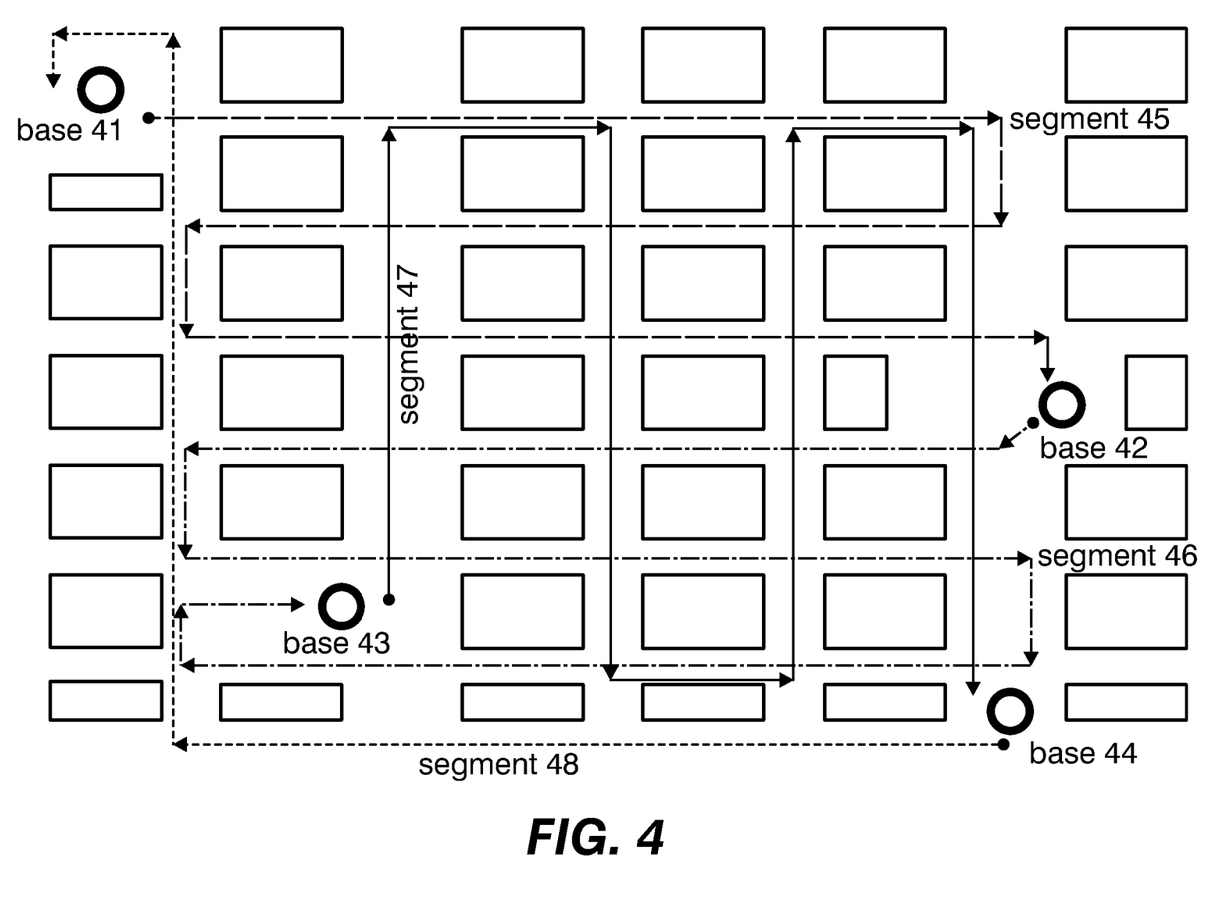
FIG. 4 is a diagram showing an example of a mission planning; and depicts

In FIG. 4, it is shown an example of a mission planning according to one of the embodiments. A mission starts with a base and ends with a base. The mission planning defines the time periods and location of the bases as well as the route of the terrestrial vehicle for each segment. It is performed at the office using existing digital maps or any other information to decide where starting and ending the mission (first "base" 41 and last "base" 44), which roads and streets to follow (the "segments" 45-48), and which intermediate stops to make (the intermediate "bases" 42, 43). In one of the embodiments, the flying height or heights above ground is defined a priori, thus the route of the aircraft is defined a priori and can be used in the mission execution for security reasons.

Referring to data acquisition of geographical information by means of sensors of both, the terrestrial vehicle and the aircraft, in some embodiments they have to distinguish between data acquisition for calibration and data acquisition for mapping.

Data acquisition for calibration refers to the collection of remote sensing payload observations that will not be directly used later for mapping. The remote sensing payload of the aircraft, in this phase of the operations, collects data at different attitudes and headings. Immediately, after a segment starts, the aircraft takes off. When it reaches the desired altitude above the terrestrial vehicle, the terrestrial vehicle starts moving and the en-route data acquisition [for mapping] part of the segment. Short before the segment ends, the terrestrial vehicle stops and the aircrafts lands.

The short periods between taking off and reaching the required altitude for en-route data acquisition, and between starting the descent from the en-route altitude to terrestrial vehicle altitude for landing, are used by the invention in one of the embodiments to perform calibration manoeuvres.

The main purpose of a calibration manoeuvre is to collect data for a posteriori improvement of the determination of the calibration parameters of the aircraft images. This improvement happens in the post-processing step. The simultaneous computation of orientation and calibration parameters occurs always, regardless of the existence of not of calibration manoeuvres at the beginning and end of the segments. However, the calibration manoeuvres contribute images that are particularly well suited to improve the determination of the calibration parameters.

Typically, the calibration manoeuvres consist on, while ascending or descending, rotating the aircraft around its vertical axis and taking images with different heading angles. The differences in heading and height are instrumental in improving the calibration ability of the ISO procedure. Typically, as well, the terrestrial vehicle does not move while the aircraft is taking-off and landing. However, in one embodiment of the invention, the terrestrial vehicle can move according to some predefined pattern to further improve the calibration results.

It shall be clear that the main goal of the calibration manoeuvres is to gather data for a posteriori use and that calibration here refers to the calibration of the imaging sensors of the remote sensing payload subsystems.

Figure 5:
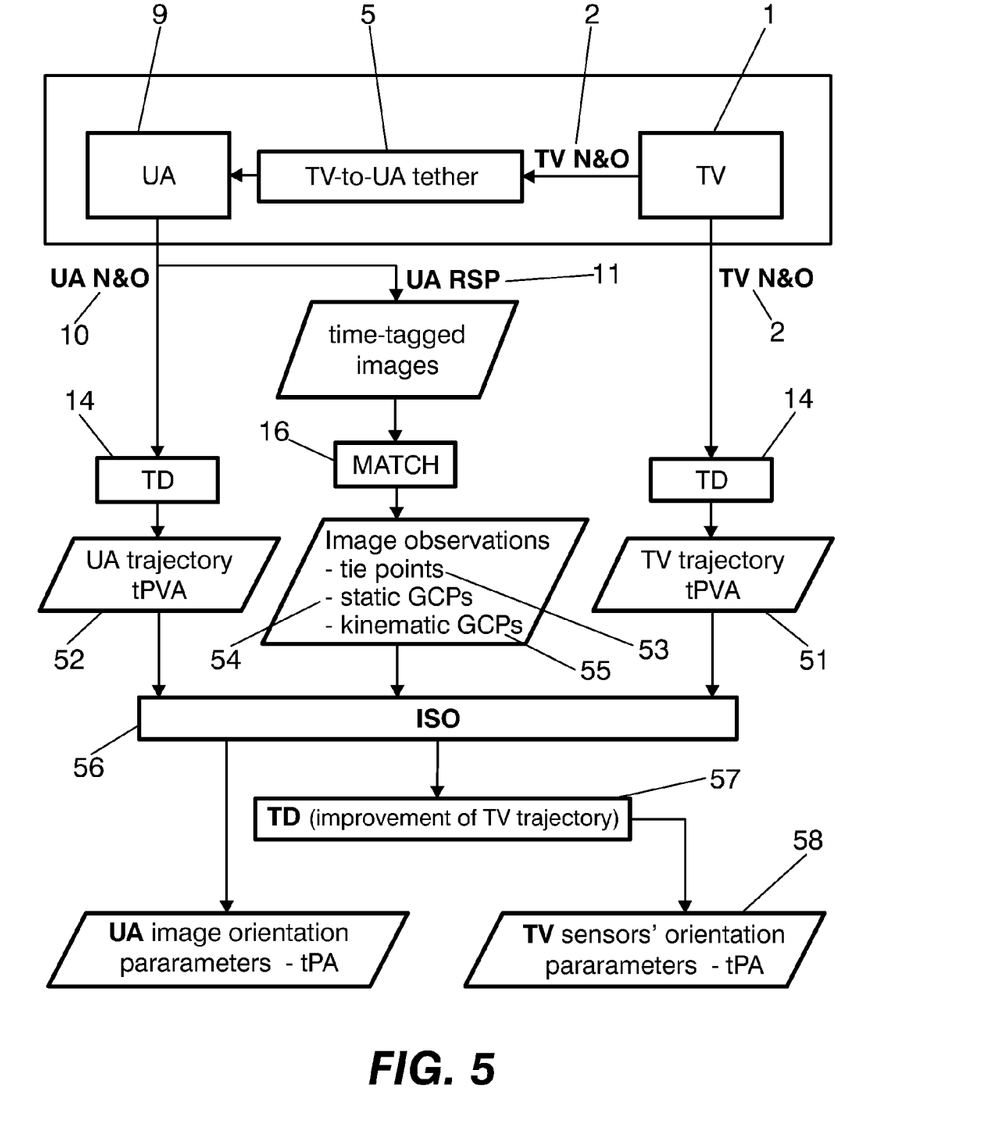
FIG. 5 is a high level flowchart of the post processing steps.

Referring to the processing of geographical information, FIG. 5 depicts a high level flowchart of the post processing steps.

A first step is the initial trajectory determination 51 of the terrestrial vehicle 1. The initial trajectory determination 51 of the terrestrial vehicle 1 includes the computation of the best possible trajectory of the terrestrial vehicle 1 by just using its own navigation sensors. Referring the term of "best trajectory" to being optimal meeting the requirements of using all the available measurements for computation of the trajectory; the estimation algorithm generating minimum variance unbiased estimates of the trajectory and, in the case of the trajectory being sequentially estimated, that Kalman both filtering and smoothing having being performed. The trajectory is a tPVA set; i.e. a time-position-velocity-attitude data set.

The terrestrial vehicle trajectory is materialized in the terrestrial vehicle navigation centre which is the origin of the vehicle's navigation coordinate reference frame. The origin of this frame is not to be confused with the terrestrial vehicle centre of masses and is not necessarily aligned with the vehicle longitudinal, traversal and vertical axes. The terrestrial vehicle navigation coordinate reference frame is materialized by the inertial measurement unit of the navigation and orientation subsystem of the terrestrial vehicle. This difference notwithstanding, the inertial measurement unit is installed in some embodiments in a way such that their axes are usually aligned with those of the terrestrial vehicle.

The initial terrestrial vehicle trajectory is computed by any standard sensor fusion and trajectory determination procedure. The sensors to be fused and used for the trajectory determination are those of the navigation and orientation terrestrial vehicle subsystem. These sensors include the GNSS receiver, the inertial measurement unit and, in some embodiments, odometers, air pressure sensors (baroaltimeters) and others.

The initial terrestrial vehicle trajectory tP, or tPVA in another embodiment, is also transferred—referred—to the targets of the optical metric target subsystem.

A second step is the initial trajectory determination of the unmanned aircraft 52. It consists on the computation of the best possible trajectory of the aircraft by just using its own navigation sensors 10. The trajectory can be a tPVA or, in another embodiment, a tP (time-position) data set. The procedure for the aircraft initial trajectory determination is analogous to that of the terrestrial vehicle initial trajectory one.

A third step is the photogrammetric measurement of image coordinates of tie points 53, static ground control points 54 and kinematic ground control points 55.

For the tie points: the result of this step is a set of IPxy type, a set of quadruples of the type:

image_id(I) point_id(P) x coordinate [of point P in image I] (x) y coordinate where (x,y) are the image coordinates of the ground point P measured on the image I. Typically, a point (P) appears in various images ($I_1, I_2, \ldots$), and an image (I) contains various points ($P_1, P_2, \ldots$). image_id and point_id are image and point unique identifiers respectively.

This measurement step is a standard procedure of modern photogrammetry that takes place within digital aerial triangulation. It is performed with standard photogrammetric image processing software.

For the static ground control points: a tie point of known ground coordinates is known as "ground control point." These known coordinates are obtained from existing maps or from independent surveys. In one embodiment of the invention, measurement of the image coordinates of ground control points is performed manually. The result of this step is analogous to that of the previous one; that is, a data set of quadruples of the type image_id (I) point_id (P) x coordinate [of point P in image I] (x) y coordinate.

This measurement step is also a standard procedure of modern photogrammetry that takes place within digital aerial triangulation. It is performed with image processing software that allow for interactive precise measurement of distinguishable ground points in one or more images simultaneously.

The known ground coordinates of the point P are independent of the above image measurement and are used in the ISO or Integrated Sensor Orientation.

For the kinematic ground control points: in contrast to static ground control points, if the terrestrial vehicle is moving, the kinematic ground control points only appear in one image. In the embodiment of mapKITE, KGCPs are materialized by the targets of the optical metric target subsystem. The coordinates of KGCPs are derived from the terrestrial vehicle initial trajectory obtained before.

Measurement of KGCPs is automatic in one embodiment of the invention but in another embodiment it is assisted.

In embodiments with an automatic measurement mode, advantage is taken of the artificial nature of the targets and of its known shape and size. Each image is analysed in search of the targets and, once found, measures:
  the image coordinates of the target centres (the usual photogrammetric measurement) and
  the targets' image sizes (which is equivalent to a photogrammetric measurement of scale because the sizes of the targets on the image are compared to their actual sizes)

In the embodiments with an assisted measurement mode, a human operator inspects each image in search of the optical metric targets. Once found, he points roughly to the target area and a pattern measurement algorithm refines the human measurement and delivers the target centre's image coordinates and target size (size on the image). By comparing the image size and the actual size of the target, the scale factor of image at that point is obtained.

The result of this step is the same quadruple as in the previous two steps plus the scale of the target (ratio between the actual target size and the image apparent target size):
  image_id (I) target_point_id (P) x coordinate [of point P in image I] (x) y coordinate
  and image_id (I) target_point_id (P) scale (s).

Note that the identifier P changes from image to image when the terrestrial vehicle moves and does not change when the terrestrial vehicle stands still. This is so because, although the point P is materialized always by a target carried by the terrestrial vehicle, a physical target defines only the same point in space as long as it does not move.

A fourth step is the integrated sensor orientation of the images acquired by the unmanned aircraft 56. In this step, the measurements obtained in the previous steps and the coordinates of static ground control points are combined in an integrated sensor orientation 17 (ISO) or combined bundle adjustment. Thus, the measurements or observations that participate in the ISO are grouped in three types: photogrammetric, ground control and aerial control. They are:
  photogrammetric measurements
    1. photogrammetric measurements of the tie points (image coordinates of the tie points),
    2. photogrammetric measurements of the static ground control points,
    3. photogrammetric measurements (of points) and photogrammetric measurements of scale of the kinematic ground control points (KGCPs),
  ground control
    4. ground coordinates of the static ground control points,
    5. ground coordinates of the kinematic ground control points (KGCPs), and
  aerial control
    6. tP (time-position) or tPVA (time-position-velocity-attitude) measurements for the UA.

The use of measurements of item 3 above (photogrammetric measurement of points and of scale) requires a new type of collinearity observation equation that it will be called scale-&-collinearity observation equation $$\begin{bmatrix} E_P \\ N_P \\ h_P \end{bmatrix}^m = \begin{bmatrix} E_i \\ N_i \\ h_i \end{bmatrix}^m + (s + v_s) \cdot R_c^m(w_i, \varphi_i, \kappa_i) \cdot \begin{bmatrix} x + v_x \\ y + v_y \\ -f \end{bmatrix}^c \quad (1)$$

where
  $(E_P, N_P, h_P)^{m^T}$ are the unknown ground coordinates of the p KGCP,
  $(E_i, N_i, h_i)^{m^T}$, $(\omega_i, \phi_i, \kappa_i)_c^{m^T}$ are the unknown exterior orientation parameters of the i image (frame camera) of the UA RSP subsystem,
  $(x, y, s)^{c^T}$, $(v_x, v_y, v_s)^{c^T}$ are the image coordinate and scale measurements and their corresponding residuals of point P observed on image i, and
  f is the known camera constant of the camera that acquired image i.

The use of measurements of item 5 above—coordinates of the KGCPs—requires two types of observation equations; a standard one $$\begin{bmatrix} E_P \\ N_P \\ h_P \end{bmatrix}^m = \begin{bmatrix} E + v_E \\ N + v_N \\ h + v_h \end{bmatrix}^m \quad (2)$$

and a new one for those sub-trajectories of the terrestrial vehicle in urban or natural canyons where GNSS measurements may be affected by occlusions and multipath $$\begin{bmatrix} E_P \\ N_P \\ h_P \end{bmatrix}^m + \begin{bmatrix} S_E \\ S_N \\ S_h \end{bmatrix}^m = \begin{bmatrix} E + v_E \\ N + v_N \\ h + v_h \end{bmatrix}^m \quad (3)$$

where
  $(E_P, N_P, h_P)^{m^T}$ are the unknown ground coordinates of the p KGCP,
  $(E, N, h)^{m^T}$, $(v_E, v_N, v_h)^{m^T}$ are the known coordinates and unknown residuals of the KGCP observations, and
  $(S_E, S_N, S_h)^{m^T}$ are the unknown TV shift parameters that model the displacement of the sub-trajectory affected by common multipath or occlusion problems.

The unknown terrestrial vehicle shift parameters $(S_E, S_N, S_h)^{m^T}$ model the positional error of a connected part of the terrestrial vehicle trajectory defined by a time interval $[t_1, t_2]$ and therefore they are associated to the two time instants $t_1$ and $t_2$. The number n of shift parameters $(S_{E_1}, S_{N_1}, S_{h_1})^{m^T}, \ldots, (S_{E_n}, S_{N_n}, S_{h_n})^{m^T}$ and their associated time intervals $[t_{1_1}, t_{2_1}], \ldots, [t_{1_n}, t_{2_n}]$ are defined by a human operator after inspection of the results of the initial terrestrial vehicle trajectory determination.

The integrated sensor orientation (ISO) is a standard photogrammetric ISO with the addition of the observations and models of equations (1) and (3) above.

After this step, the imaging sensors of the remote sensing payload are declared optimally oriented and calibrated.

A fifth step is the improvement of the trajectory determination of the terrestrial vehicle. In this embodiment of the invention, called mapKITE, the terrestrial vehicle trajectory determined in the first step is corrected by using the n shift parameters estimated in the fourth step. For this purpose, the first step is repeated and the GNSS observations—range or carrier-phase observations—or the GNSS-derived observations—control point observations—corresponding to the sub-trajectories defined by $[t_{1_1}, t_{2_1}], \ldots, [t_{1_n}, t_{2_n}]$ are replaced by the control point observations obtained by adding the shifts $(S_{E_1}, S_{N_1}, S_{h_1})^{m^T}, \ldots, (S_{E_n}, S_{N_n}, S_{h_n})^{m^T}$—obtained in the fourth step—to the original points of the corresponding sub-trajectories.

After this step, the tPVA trajectory of the terrestrial vehicle is declared optimally estimated.

A sixth step is the orientation of the mapping sensors of the terrestrial vehicle. In the previous step an improved tPVA trajectory for the terrestrial vehicle is determined. This trajectory is now used to assign positions, velocities and attitudes to the sensors of the terrestrial vehicle remote sensing payload (TV RSP). This is called "to transfer the tPVA trajectory to the sensors."

In other words, in this last step, the improved tPVA trajectory determined in the previous step is transferred to the sensors of the TV RSP; i.e., the position, velocity and attitude of the terrestrial vehicle navigation coordinate reference frame (CRF) is transformed into position, velocity and attitude of each remote sensing payload sensor with the help of the relative orientation of each sensor CRF with respect to the terrestrial vehicle navigation CRF.

After this step, the imaging sensors of the remote sensing payload are declared optimally oriented.

To conclude with the operation of this embodiment (mapKITE), the results achieved are a best estimation of the orientation and calibration parameters of all remote sensing payload images; the terrestrial vehicle trajectory and the orientation of all the images acquired by the remote sensing payload systems.

Changes and modifications to the specifically described embodiments may be carried out without departing from the principles of the present invention, which is intended to be limited only by the scope of the appended claims as interpreted according to the principles of patent law including the doctrine of equivalents.

The invention claimed is:

1. A method for the acquisition and post-processing of geographical information of a path for corridor mapping, wherein the method comprises:
   an initial acquisition phase comprising the steps of:
   a) acquiring geographical data and information by means of a plurality of sensors of a terrestrial vehicle;
   b) sending trajectory information of the terrestrial vehicle to an aircraft, from a control station hosted on the terrestrial vehicle, every certain period of time, where the time period is a design parameter;
   c) when the aircraft receives the trajectory information of the terrestrial vehicle, the aircraft determines its trajectory according to the trajectory information of the terrestrial vehicle received, wherein the aircraft follows the same trajectory as the terrestrial vehicle with a temporal and spatial offset, where a time delay and a vector difference between the aircraft and the terrestrial vehicle is a design parameter that can vary with time according to the commands of an operator;
   d) acquiring, simultaneously to step a), geographical data and information, including images, by means of a plurality of sensors of the aircraft;
   and, after the acquisition phase, a post-processing phase comprising the steps of:
   e) inputting, in a post-processing module, the geographical data and information acquired in the previous steps, which comprises images acquired by the aircraft, geographical information previously known, navigation information including time, position, velocity and attitude, coordinates of kinematic control points associated to the center of a roof target of the terrestrial vehicle, image coordinates and scale factor of the kinematic ground control points associated to said roof target of the terrestrial vehicle;
   f) identifying a same ground element in different images acquired by the image sensor of the aircraft and measuring its image coordinates;
   g) obtaining, in the post-processing module, the orientation of the sensors of both terrestrial vehicle and aircraft according to the inputs of step e) and step f);
   h) calibrating, in the post-processing module, the sensors of both terrestrial vehicle and aircraft according to the inputs of step e) and step f); and
   i) associating every image acquired with the orientation and calibration obtained in steps g) and h) respectively.

2. The method according to claim 1, wherein the kinematic ground control point associated to the terrestrial vehicle further comprises figures of known size and shape, on the roof of the terrestrial vehicle, whose ground coordinates are computed and whose image coordinates and scale factor are measured on the images acquired.

3. The method according to claim 2, wherein the obtaining the orientation and the calibrating the sensors of the aircraft further comprises using positional, attitude, size and shape information of the geometrical figures on the roof of the terrestrial vehicle.

4. The method according to claim 1, wherein kinematic ground control points associated to the terrestrial vehicle further comprise radiometric calibration targets on the roof of the terrestrial vehicle configured to be used for radiometric modelling and sensor radiometric calibration.

5. The method according to claim 1, wherein the images acquired are time-tagged.

6. The method according to claim 1, further comprising analysing the data and geographical information obtained by the plurality of sensors of the terrestrial vehicle according to error patterns and known causes of errors to identify systematic errors or the potential existence of systematic errors in a computed trajectory of the terrestrial vehicle.

7. The method according to claim 6, wherein when a possible systematic error is identified, the trajectory information acquired by the terrestrial vehicle is corrected by the geographical data and information acquired by the aircraft and by its trajectory.

8. A system for the acquisition and post-processing of geographical information of a path for corridor mapping, the system comprising:
   a terrestrial vehicle equipped with a plurality of sensors configured to acquire geographical data and information;
   a control station hosted on the terrestrial vehicle, the control station configured to send trajectory information of the terrestrial vehicle to an aircraft every certain period of time, where the time period is a design parameter;
   an aircraft in communication with the terrestrial vehicle, wherein the aircraft is equipped with a plurality of sensors including an image sensor, and is configured to determine its trajectory according to the trajectory information received from the terrestrial vehicle, wherein the aircraft is operable to follow the same trajectory as the terrestrial vehicle with a temporal and spatial offset, where a time delay and a vector difference between the aircraft and the terrestrial vehicle is a design parameter that can vary with time according to the commands of an operator, and wherein the aircraft is configured to acquire geographical data and information, including images, simultaneously to the terrestrial vehicle by means of the plurality of sensors of the aircraft; and a post-processing module configured for:
- receiving as input the geographical data and information acquired by the respective pluralities of sensors of the terrestrial vehicle and the aircraft, which comprises geographical information previously known, navigation information including time, position, velocity and attitude, ground coordinates of the kinematic ground control points associated to a roof target of the terrestrial vehicle, and image coordinates and scale factors of the roof target;
- identifying a same element in different images acquired by the image sensor of the aircraft and measuring their image coordinates and further receiving these measurements as input to the processing module;
- obtaining the orientation of the sensors of both terrestrial vehicle and aircraft according to the inputs received;
- calibrating the sensors of both terrestrial vehicle and aircraft according to the inputs received; and
- associating every image acquired with the orientation and calibration obtained.

9. The system according to claim 8, wherein the aircraft comprises a plurality of image sensors.

10. The system according to claim 9, wherein the roof target of the terrestrial vehicle comprises geometric figures.

11. The system according to claim 10, wherein the terrestrial vehicle comprises a plurality of image sensors.

* * * * *

UNITED STATES PATENT AND TRADEMARK OFFICE
CERTIFICATE OF CORRECTION

PATENT NO.       : 9,477,230 B2
APPLICATION NO.  : 14/417435
DATED            : October 25, 2016
INVENTOR(S)      : Jaume Sastre I Sastre It is certified that error appears in the above-identified patent and that said Letters Patent is hereby corrected as shown below:

Column 7
Line 8, "ψ, θ, γ" should read --"ψ, ϑ, γ"--

Column 14
Line 9, "p" should read --*p*--
Line 11, "i" should read --*i*--
Line 15, "p" should read --*p*--
Line 15, "i" should read --*i*--
Line 16, "f" should read --*f*--
Line 17, "i" should read --*i*--
Line 41, "p" should read --*p*--
Line 51, "n" should read --*n*--

Signed and Sealed this
Thirteenth Day of March, 2018

Andrei Iancu
*Director of the United States Patent and Trademark Office*